(12) United States Patent
Cho et al.

(10) Patent No.: US 11,240,230 B2
(45) Date of Patent: Feb. 1, 2022

(54) AUTOMATIC AUTHENTICATION PROCESSING METHOD AND SYSTEM USING DIVIDING FUNCTION

(71) Applicants: WAEM CO., LTD., Seoul (KR); Rae Sung Cho, Seoul (KR); Dong Hyun Cho, Seoul (KR)

(72) Inventors: Rae Sung Cho, Seoul (KR); Dong Hyun Cho, Seoul (KR)

(73) Assignee: WAEM CO., LTD., Seoul (KR)

( * ) Notice: Subject to any disclaimer, the term of this patent is extended or adjusted under 35 U.S.C. 154(b) by 236 days.

(21) Appl. No.: 16/486,706

(22) PCT Filed: Mar. 2, 2018

(86) PCT No.: PCT/KR2018/002545
§ 371 (c)(1),
(2) Date: Aug. 16, 2019

(87) PCT Pub. No.: WO2018/160039
PCT Pub. Date: Sep. 7, 2018

(65) Prior Publication Data
US 2019/0372967 A1 Dec. 5, 2019

(30) Foreign Application Priority Data
Mar. 3, 2017 (KR) .................. 10-2017-0027652

(51) Int. Cl.
*H04L 29/06* (2006.01)
(52) U.S. Cl.
CPC ........ *H04L 63/0838* (2013.01); *H04L 63/102* (2013.01)
(58) Field of Classification Search
CPC .......................... H04L 63/0838; H04L 63/102
See application file for complete search history.

(56) References Cited

U.S. PATENT DOCUMENTS 8,412,928 B1 * 4/2013 Bowness ............. H04L 63/0838
713/155
8,572,684 B1 * 10/2013 Sama ................... H04L 9/3228
726/2
(Continued)

FOREIGN PATENT DOCUMENTS

KR   10-2014-0000631 A    1/2014
KR   10-2015-0120745 A    10/2015
(Continued)

OTHER PUBLICATIONS

International Search Report dated Jun. 7, 2018, issued in International Application No. PCT/KR2018/002545, filed Mar. 2, 2018, 4 pages.

*Primary Examiner* — Jason Chiang
(74) *Attorney, Agent, or Firm* — Christensen O'Connor Johnson Kindness PLLC

(57) ABSTRACT

Disclosed is an automatic authentication processing method and system using a dividing function. An authentication processing method performed by a computer-implementing service server comprises the steps of: (1) receiving, from a first electronic device, a service subscription request including user identification information and device information of the first electronic device; (2) requesting and receiving a one-time password (OTP) from an authentication server according to the service subscription request, wherein a first divided OTP and a second divided OTP, which are obtained by dividing the OTP, are received; (3) in response to the service subscription request, storing the first divided OTP together with the user identification information and the device information, and transmitting the second divided OTP to the first electronic device; and (4) in a case of a service requiring authentication for the user identification information, transmitting the first divided OTP together with (Continued)

the second divided OTP received from the first electronic device to the authentication server so as to perform authentication processing.

10 Claims, 8 Drawing Sheets

(56) References Cited

U.S. PATENT DOCUMENTS

| | | | | |
|---|---|---|---|---|
| 8,832,788 | B1* | 9/2014 | Gibson | G06F 21/40 |
| | | | | 726/2 |
| 9,178,880 | B1* | 11/2015 | Dotan | H04W 12/06 |
| 9,780,950 | B1* | 10/2017 | Dundas | H04L 9/006 |
| 2007/0005955 | A1* | 1/2007 | Pyle | H04L 9/3273 |
| | | | | 713/156 |
| 2012/0204245 | A1* | 8/2012 | Ting | H04L 9/3228 |
| | | | | 726/6 |
| 2012/0210408 | A1* | 8/2012 | Lu | H04L 63/0846 |
| | | | | 726/6 |
| 2013/0145449 | A1* | 6/2013 | Busser | G06F 21/31 |
| | | | | 726/7 |
| 2013/0179350 | A1* | 7/2013 | Kirillin | G06Q 20/4014 |
| | | | | 705/64 |
| 2013/0262857 | A1* | 10/2013 | Neuman | H04L 63/18 |
| | | | | 713/155 |
| 2015/0349958 | A1* | 12/2015 | Lindell | H04L 9/3228 |
| | | | | 713/168 |
| 2017/0279795 | A1* | 9/2017 | Redberg | H04L 63/0861 |
| 2019/0080060 | A1* | 3/2019 | Lee | G06F 21/31 |

FOREIGN PATENT DOCUMENTS

| | | |
|---|---|---|
| KR | 10-2015-0142773 A | 12/2015 |
| KR | 10-2016-0040657 A | 4/2016 |
| WO | 2014/092286 A1 | 6/2014 |
| WO | 2016/126052 A2 | 8/2016 |

* cited by examiner

AUTOMATIC AUTHENTICATION PROCESSING METHOD AND SYSTEM USING DIVIDING FUNCTION

TECHNICAL FIELD

The following description relates to a method of processing user authentication.

BACKGROUND ART

In order to protect a variety of types of information, several methods, such as an encryption method and an information access restriction method, are suggested. However, if the information system of a person who handles information is exposed, the leakage of information stored in the information system cannot be prevented and whether the information is used is unknown.

In order to prevent information leakage, it is necessary to prevent information, stored in an information system, from being recovered although the information system is exposed. There is a need to recognize an attempt to use information and to preclude abnormal use of information.

As an example of a user authentication technique, Korean Patent Application Publication No. 10-2016-0040657 (Apr. 14, 2016) discloses an authentication technique in which authentication information pieces of each of the users of image processors are managed in a centralized manner and each of the image processors performs user authentication.

DISCLOSURE

Technical Problem

There are provided an automatic authentication processing method and system capable of service subscription through a simple procedure and of user authentication without an additional behavior.

There are provided an automatic authentication processing method and system for discarding an old password, generating a new password, and allocating the new password in each step in which user authentication is necessary.

Technical Solution

An authentication processing method performed in a service server implemented as a computer provides an authentication processing method, including (1) receiving a service subscription request, including user identification (ID) information and device information of a first electronic device, from the first electronic device, (2) receiving a one-time password (OTP) from an authentication server by requesting the OTP in response to the service subscription request, wherein a first divided OTP and second divided OTP divided from the OTP are received, (3) storing the first divided OTP along with the user ID information and the device information in response to the service subscription request and transmitting the second divided OTP to the first electronic device, and (4) transmitting the second divided OTP, received from the first electronic device, to the authentication server along with the first divided OTP with respect to a service requiring authentication for the user ID information, and performing authentication processing.

According to an aspect, the step (2) may include dividedting, by the authentication server, the OTP generated by an OTP server into the first divided OTP and the second divided OTP in response to a request from the authentication server, and receiving the first divided OTP and the second divided OTP from the authentication server.

According to another aspect, the step (3) includes storing the first divided OTP, the user ID information, and the device information in a first database (DB) included in the service server or connected to the service server by matching the first divided OTP up with the user ID information and the device information. The second divided OTP may be stored in a second DB included in the first electronic device or connected to the first electronic device.

According to yet another aspect, the step (4) may include discarding an old OTP in the service server and the first electronic device for each service requiring authentication for the user ID information, generating a new OTP for the first electronic device, and allocating the new OTP.

According to yet another aspect, the step (4) includes the steps of receiving a service use request, including the user ID information, the device information, and the second divided OTP, from the first electronic device, reading the first divided OTP matched up with the user ID information and device information included in the service use request, transmitting the read first divided OPT to the authentication server along with the second divided OTP included in the service use request, permitting the service requested by the first electronic device if the authentication server succeeds in OTP verification, receiving a new OTP from the authentication server, wherein a third divided OTP and fourth divided OTP divided from the new OTP are received, discarding the first divided OTP related to the user ID information and the device information, storing the third divided OTP, and transmitting the fourth divided OTP to the first electronic device. The second divided OTP stored in the first electronic device may be discarded and the fourth divided OTP may be stored.

According to yet another aspect, the step (4) includes the steps of receiving a service use request, including the user ID information of the first electronic device, from a second electronic device, searching for the device information matched up with the user ID information included in the service use request, requesting the second divided OTP from the first electronic device corresponding to the device information, transmitting the second divided OTP to the authentication server along with the first divided OTP matched up with the user ID information included in the service use request when the second divided OTP is received from the first electronic device, permitting the service requested by the second electronic device if the authentication server succeeds in OTP verification and receiving a new OTP from the authentication server, wherein a third divided OTP and fourth divided OTP divided from the new OTP are received, discarding the first divided OTP related to the user ID information and the device information, storing the third divided OTP, and transmitting the fourth divided OTP to the first electronic device. The second divided OTP stored in the first electronic device may be discarded and the fourth divided OTP may be stored.

A service server implemented as a computer provides a service server, including at least one processor implemented to execute a computer-readable command. The at least one processor receives a service subscription request, including user identification (ID) information and device information of a first electronic device, from the first electronic device, receives a one-time password (OTP) from an authentication server by requesting the OTP in response to the service subscription request, wherein a first divided OTP and second divided OTP divided from the OTP are received, stores the first divided OTP along with the user ID information and the device information in response to the service subscription request, transmits the second divided OTP to the first electronic device, transmits the second divided OTP, received from the first electronic device, to the authentication server along with the first divided OTP with respect to a service requiring authentication for the user ID information, and performs authentication processing.

An authentication processing method performed in a service server implemented as a computer provides an authentication processing method, including (1) receiving a service subscription request, including user identification (ID) information and device information of a first electronic device, from the first electronic device, (2) receiving a one-time password (OTP) from an OTP server by requesting the OTP in response to the service subscription request and dividedting the received OTP into a first divided OTP and a second divided OTP, (3) storing the first divided OTP along with the user ID information and the device information with respect to the service subscription request, and transmitting the second divided OTP to the first electronic device, and (4) performing authentication processing using the first divided OTP along with the second divided OTP received by requesting the second divided OTP from the first electronic device with respect to a service requiring authentication for the user ID information.

A service server implemented as a computer provides a service server, including at least one processor implemented to execute a computer-readable command. The at least one processor receives a service subscription request, including user identification (ID) information and device information of a first electronic device, from the first electronic device, receives a one-time password (OTP) from an OTP server by requesting the OTP in response to the service subscription request and divideds the received OTP into a first divided OTP and a second divided OTP, stores the first divided OTP along with the user ID information and the device information with respect to the service subscription request, and transmits the second divided OTP to the first electronic device, and performs authentication processing using the first divided OTP along with the second divided OTP received by requesting the second divided OTP from the first electronic device with respect to a service requiring authentication for the user ID information.

Advantageous Effects

In accordance with the embodiments of the present invention, service subscription is possible through a simpler procedure because a user does not need to generate or input a password for authentication.

In accordance with the embodiments of the present invention, a more enforced authentication system can be provided because one-time password is used for authentication and a used password is discarded and immediately substituted with a new password.

In accordance with the embodiments of the present invention, a consecutive authentication effect can be achieved because a new password is generated through the medium of an old password in each behavior consecutively from the start of service.

In accordance with the embodiments of the present invention, safe processing can be performed because continuous authentication is performed in all the steps of service without additional authentication, such as a password or a certificate.

BEST MODE FOR INVENTION

Hereinafter, embodiments of the present invention are described in detail with reference to the accompanying drawings.

Figure 1:
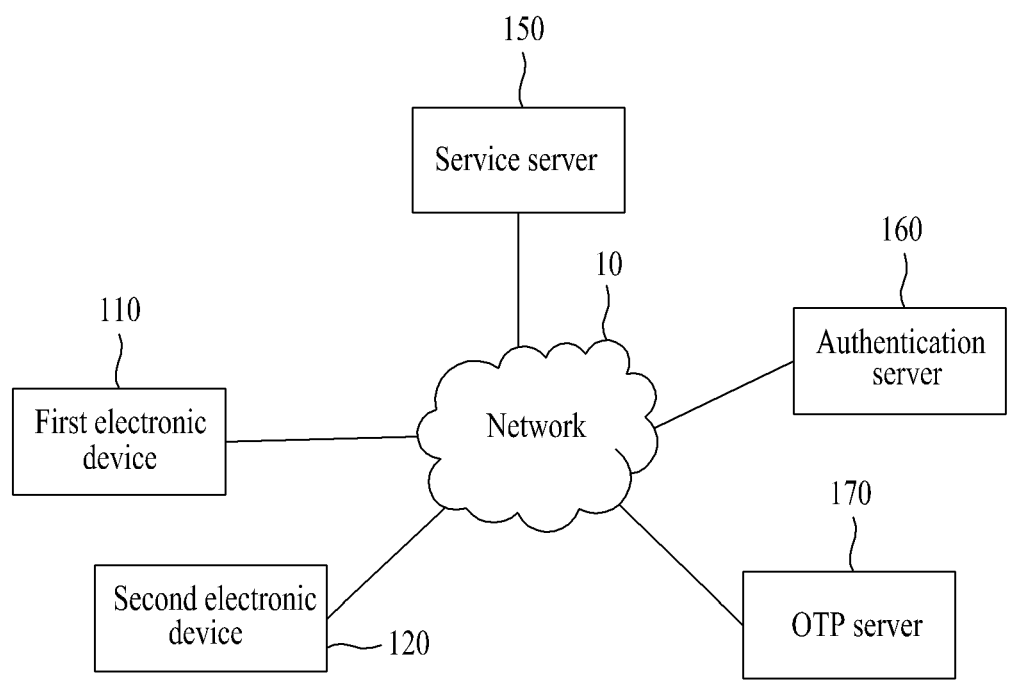
FIG. 1 is a diagram showing an example of a network environment for user authentication in an embodiment of the present invention.

FIG. 1 is a diagram showing an example of a network environment for user authentication in an embodiment of the present invention. The network environment of FIG. 1 shows an example including a plurality of electronic devices 110 and 120, a plurality of servers 150, 160, and 170, and a network 10. FIG. 1 is an example for the description of the invention, and the number of electronic devices or the number of servers is not limited to FIG. 1.

The plurality of electronic devices 110 and 120 may be fixed type terminals or movable type terminals implemented as computer devices. The plurality of electronic devices 110 and 120 may include a smartphone, a mobile phone, a navitator, a computer, a laptop, a terminal for digital broadcasting, a personal digital assistants (PDA), a portable multimedia player (PMP), and a tablet PC, for example. For example, the first electronic device 110 may communicate with a different electronic device 120 and/or the servers 150, 160, and 170 over the network 10 using a wireless or wired communication method.

The communication method is not limited, and may include short-distance wireless communication between devices in addition to a communication method using a communication network (i.e., a mobile communication network, wired Internet, wired Internet or a broadcast network) in which the network 10 may be included. For example, the network 10 may include one or more given networks of networks, such as a personal area network (PAN), a local area network (PAN), a campus area network (CAN), a metropolitan area network (MAN), a wide area network (WAN), a broadband network (BBN), and the Internet. Furthermore, the network 10 may include given one or more of network topologies, including a bus network, a start network, a ring network, a mesh network, a star-bus network, a tree network and a hierarchical network, but is not limited thereto.

The service server 150 may be implemented as a computer device or a plurality of computer devices that provides a command, code, a file, content, or service through communication with the plurality of electronic devices 110 and 120 and/or different servers 160 and 170 over the network 10. The service server 150 may communicate with the plurality of electronic devices 110 and 120 and/or different servers 160 and 170 over the network 10 using a wireless or wired communication method.

For example, the service server 150 provides a service platform, and may provide services that require user authentication, such as bank online service, bank automation device service, a social service, and an e-mail service, for example. The authentication server 160 is a system processing user authentication, and may process authentication for the user of the first electronic device 110 in response to a request from the service server 150 and forward the results of the processing to the service server 150. In this case, the service server 150 may provide service requested by the user when the user authentication of the first electronic device 110 is successful through the authentication server 160. The authentication server 160 may use a one-time password (OTP), provided by the OTP server 170, to process the user authentication of the first electronic device 110. The OTP server 170 is a system generating a password, and may randomly generate an OTP in response to a request from the authentication server 160 and provide the generated OTP to the authentication server 160.

Figure 2:
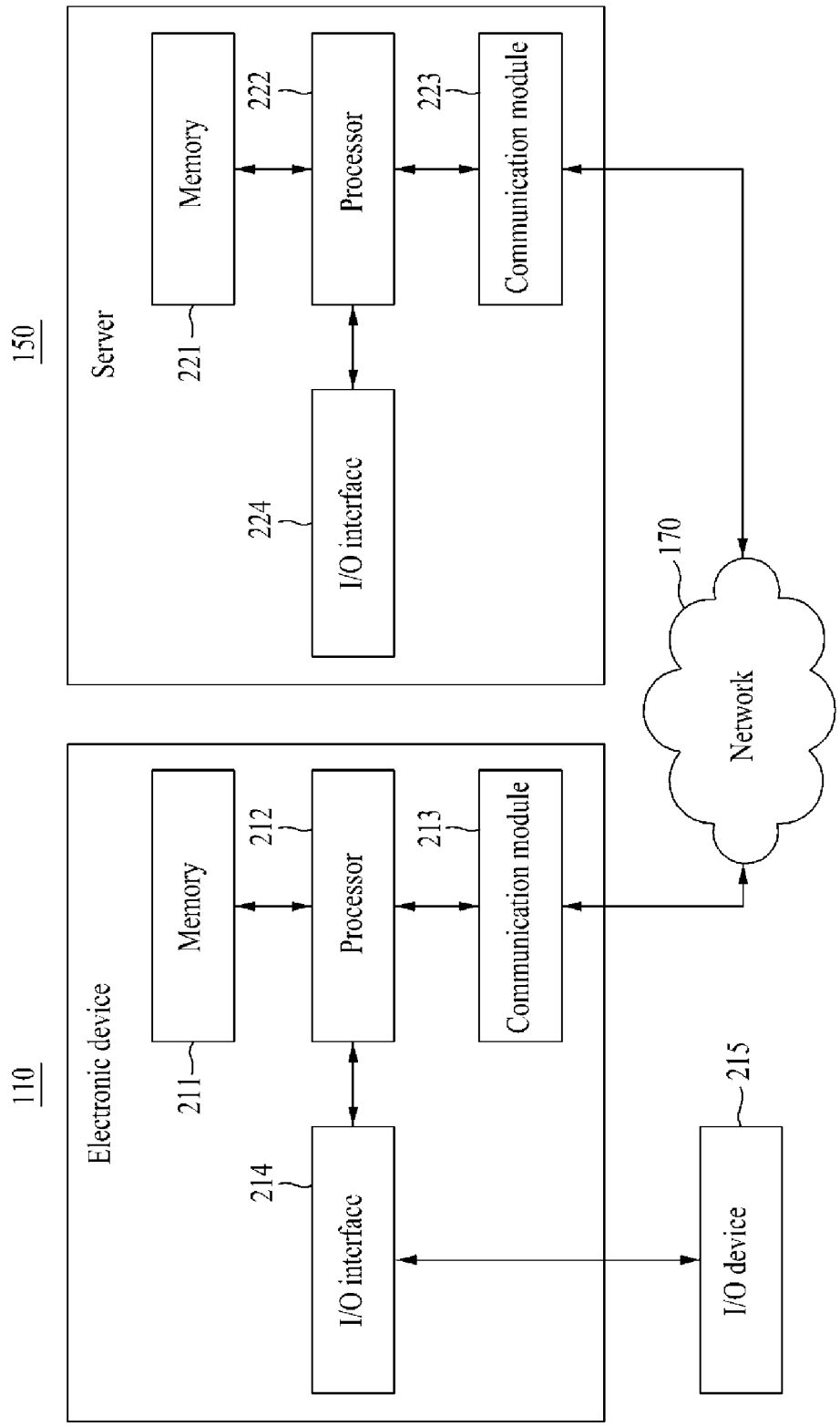
FIG. 2 is a block diagram for illustrating an internal configuration of an electronic device and a server in an embodiment of the present invention.

FIG. 2 is a block diagram for illustrating an internal configuration of an electronic device and a server in an embodiment of the present invention. FIG. 2 illustrates the internal configuration of the first electronic device 110 as an example of one electronic device and the internal configuration of the service server 150 as an example of one server. A different electronic device 120 or the servers 160 and 170 may also have the same or similar internal configuration.

The first electronic device 110 and the service server 150 may include memory 211 and 221, processors 212 and 222, communication modules 213 and 223, and input/output interfaces 214 and 224. The memory 211, 221 is a computer-readable recording medium, and may include a permanent mass storage device, such as random access memory (RAM), read only memory (ROM) and a disk drive. Furthermore, the memory 211, 221 may store an operating system or at least one program code (e.g., code for an app installed and driven in the first electronic device 110). Such software elements may be loaded from a computer-readable recording medium different from the memory 211, 221. Such a separate computer-readable recording medium may include a computer-readable recording medium, such as a floppy drive, a disk, a tape, a DVD/CD-ROM drive, or a memory card. In another embodiment, the software elements may be loaded onto the memory 211, 221 through the communication module 213, 223 other than a computer-readable recording medium.

The processor 212, 222 may be configured to process a command of a computer program by performing basic arithmetic, logic and input/output operation. The command may be provided to the processor 212, 222 by the memory 211, 221 or the communication module 213, 223. For example the processor 212, 222 may be configured to execute a received command based on program code stored in a recording device, such as the memory 211, 221.

The communication module 213, 223 may provide a function for mutual communication between the first electronic device 110 and the service server 150 over the network 10, and may provide a function for communication with a different electronic device (e.g., the second electronic device 120) or a different server (e.g., the server 160 or 170). For example, a request generated by the processor 212 of the first electronic device 110 in response to program code stored in a recording device, such as the memory 211, may be forwarded to the service server 150 over the network 10 through control of the communication module 213. Inversely, a control signal, a command, content, or a file provided under the control of the processor 222 of the service server 150 may be received by the first electronic device 110 through the communication module 213 of the first electronic device 110 via the communication module 223 and the network 10. For example, a control signal or command of the service server 150 received through the communication module 213 may be forwarded to the processor 212 or the memory 211, and content or a file may be stored in a storage medium which may be further included in the first electronic device 110.

The input/output interface 214, 224 may be means for an interface with the input/output device 215, 225. For example, the input device may include a device, such as a keyboard or a mouse. Furthermore, the output device may include a device, such as a display for displaying a communication session of an application. For another example, the input/output interface 214 may be means for an interface with a device in which functions for input and output are integrated into one, such as a touch screen. For a detailed example, when the processor 212 of the first electronic device 110 processes a command of a computer program loaded onto the memory 211, a service screen or content configured using data provided by the service server 150 or the second electronic device 120 may be displayed on the display through the input/output interface 214.

Furthermore, in other embodiments, the first electronic device 110 and the service server 150 may include more elements than the elements of FIG. 2. However, most of conventional elements do not need to be clearly shown. For example, the first electronic device 110 may be implemented to include at least some of the input/output devices 215 or may further include other elements, such as a transceiver, a global positioning system (GPS) module, a camera, a variety of types of sensor, and a database. For a detailed example, if the first electronic device 110 is a smartphone, in general, the first electronic device 110 may be implemented to further include various elements, such as an acceleration sensor or gyro sensor, a camera, a variety of types of physical buttons, a button using a touch panel, an input/output port, and a vibrator for vibration included in the smartphone.

Figure 3:
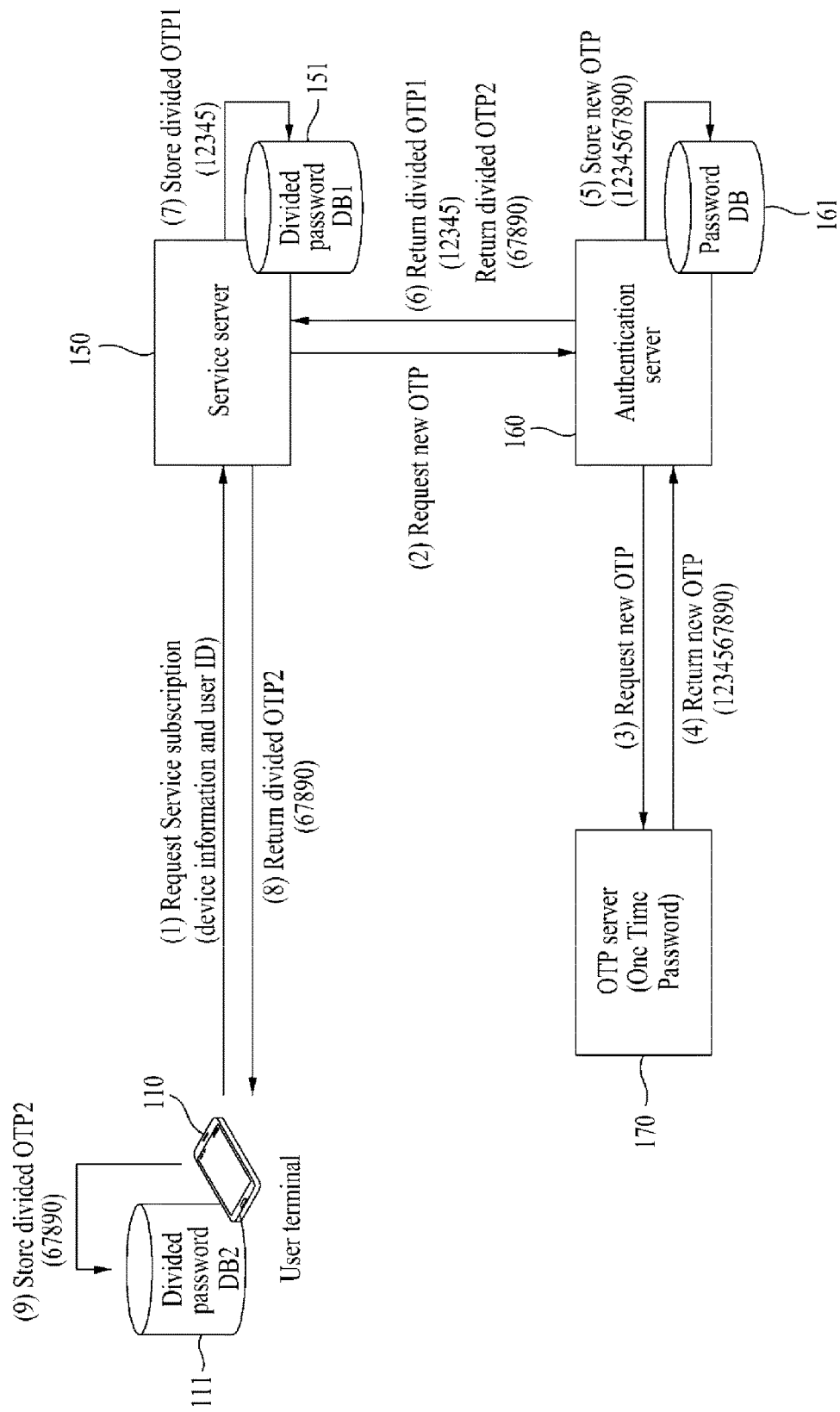
FIG. 3 is an exemplary diagram for illustrating a service subscription procedure using a first electronic device in an embodiment of the present invention.

FIG. 3 is an exemplary diagram for illustrating a service subscription procedure using a first electronic device in an embodiment of the present invention.

Figure 4:
FIG. 4 shows an example of a service subscription screen in an embodiment of the present invention.

(1) When a user accesses the service server 150 through the first electronic device 110 and inputs user identification information (e.g., ID, a telephone number or an e-mail address) (hereinafter referred to as a "user ID"), the first electronic device 110 transmits a service subscription request to the service server 150. In this case, the service subscription request may include a user ID input by the user and device information, that is, unique information by which the first electronic device 110 can be identified. FIG. 4 is an exemplary diagram showing a service subscription screen provided by the service server 150 and displayed on a screen of the first electronic device 110. As shown in FIG. 4, the service subscription screen is configured with a screen for inputting a user ID, and provides an environment in which minimum information, such as an emergency call for handling a loss of a user ID or a variety of types of accidents, can be input.

(2) The service server 150 requests a new OTP from the authentication server 160 in response to the service subscription request of the first electronic device 110. In this case, when the service server 150 requests the new OTP, it forwards the user ID for service subscription to the authentication server 160.

(3) The authentication server 160 requests a new OTP from the OTP server 170 in response to the new OTP request of the service server 150.

(4) The OTP server 170 randomly generates an OTP in response to the new OTP request of the authentication server 160, and transmits the generated OTP to the authentication server 160. The OTP may be freely generated automatically without being limited to the length of the OTP or whether the OTP includes a special letter.

(5) The authentication server 160 stores the OTP, received from the OTP server 170, in a database (DB) (hereinafter referred to as a "password DB") 161 which is included in the authentication server 160 or connected to the authentication server 160. In this case, the authentication server 160 stores the OTP, received from the OTP server 170 in response to the new OTP request of the service server 150, along with the user ID received from the service server 150. Particularly, the authentication server 160 generates two OTPs, that is, a divided OTP1 and a divided OTP2, by dividedting the OTP received from the OTP server 170. For example, if an OTP received from the OTP server 170 is {1234567890}, the authentication server 160 may divided the OTP into a divided OTP1 {12345} and a divided OTP2 {67890}.

(6) The authentication server 160 transmits the divided OTP1 and the divided OTP2 to the service server 150 that has requested the new OTP.

(7) The service server 150 receives the divided OTP1 and the divided OTP2 from the authentication server 160, and stores one of the two divided OTPs, for example, the divided OTP1 in a DB (hereinafter referred to as a "server divided password DB") 151 which is included in the service server 150 or connected to the service server 150. In this case, the service server 150 matches the user ID and device information, included in the service subscription request of the first electronic device 110, up with the divided OTP1, and stores the matching results in the server divided password DB 151.

(8) The service server 150 transmits the other of the divided OTP1 and the divided OTP2 received from the authentication server 160, for example, the divided OTP2 to the first electronic device 110 that has requested the service subscription.

(9) The first electronic device 110 stores the divided OTP2, received from the service server 150 as a response to the service subscription request, in a DB (hereinafter referred to as a "device divided password DB") 111 which is included in the first electronic device 110 or connected to the first electronic device 110. In this case, the first electronic device 110 matches the user ID input by the user and the device information of the first electronic device 110 up with the divided OTP2, and stores the matched results in the device divided password DB 111.

Accordingly, the first electronic device 110 may complete the service subscription procedure by receiving some (e.g., the divided OTP2) of the OTPs from the service server 150 with respect to the service subscription request. An OTP can be automatically generated immediately in response to a service subscription request from the first electronic device 110 and can be allocated to the first electronic device 110. In this case, some of the OTPs allocated to the first electronic device 110 are stored in the server divided password DB 151, and the remainder is stored in the device divided password DB 111.

Figure 5:
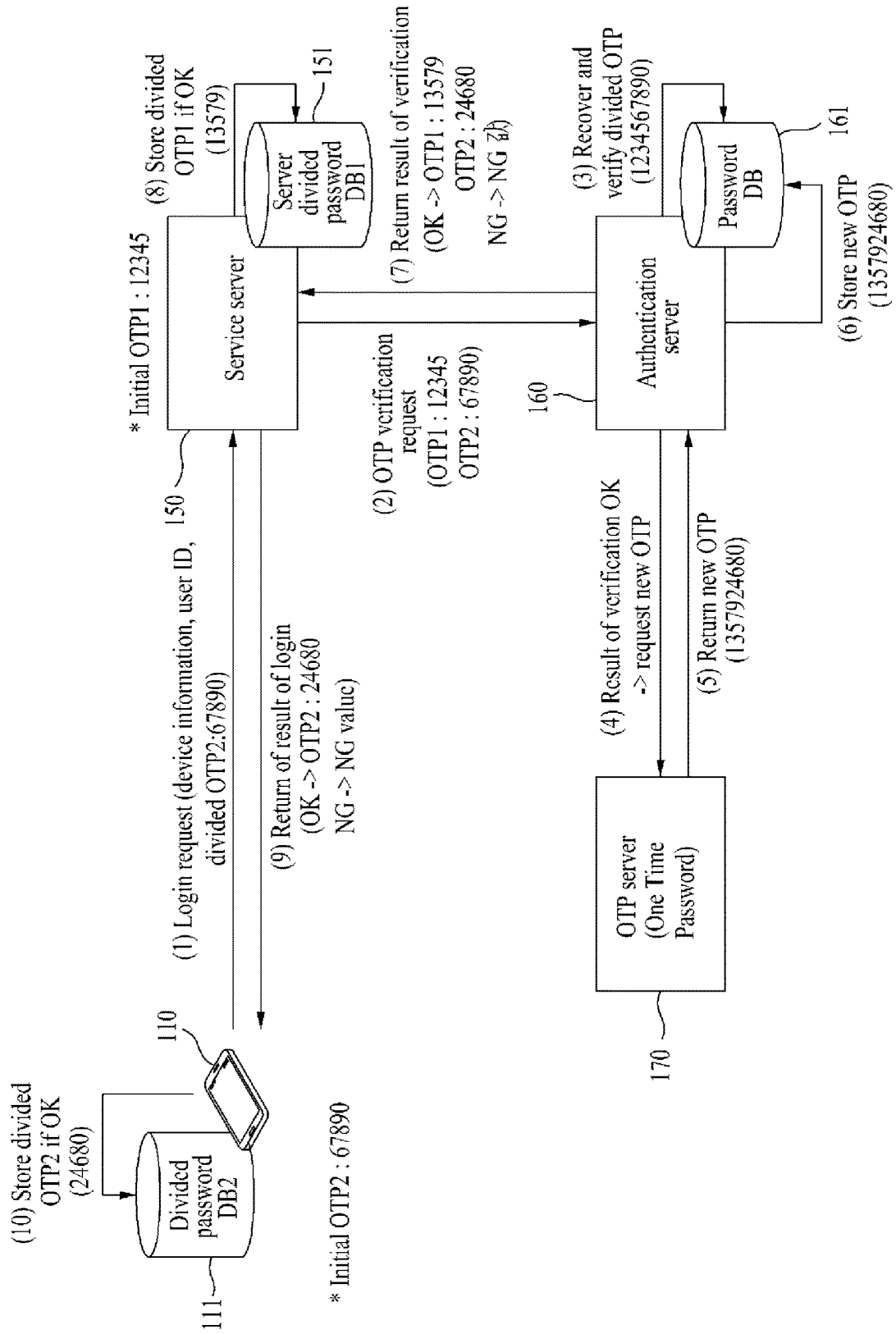
FIG. 5 is an exemplary diagram for illustrating an authentication processing procedure using a first electronic device that has joined service in an embodiment of the present invention.

FIG. 5 is an exemplary diagram for illustrating an authentication processing procedure using a first electronic device that has joined service in an embodiment of the present invention.

If the user of the first electronic device 110 wants to access the service server 150 using the first electronic device 110 after service subscription for the first electronic device 110, the user does not need to input any information in addition to a user ID as information for user authentication.

Figure 6:
FIGS. 6 and 7 show examples of a service access screen in an embodiment of the present invention.

(1) When the user executes a dedicated application related to the service server 150 or presses an access button in a service page related to the service server 150 through the first electronic device 110, the first electronic device 110 transmits the service access request to the service server 150. In this case, the first electronic device 110 automatically reads device information, a user ID, and a divided OTP2 stored in the device divided password DB 111, and transmits the service access request, including the information, to the service server 150. As shown in FIG. 6, the initial execution screen of a dedicated application or service page provides only an access button as a user interface for service access, and does not require separate information for service access.

(2) When the service server 150 receives the service access request from the first electronic device 110, it reads a divided OTP1, matched up with the device information and user ID included in the service access request, from the server divided password DB 151, and requests OTP authentication verification by transmitting the read divided OTP1 to the authentication server 160 along with a divided OTP2 included in the service access request. In this case, the service server 150 forwards the user ID that has requested service access to the authentication server 160 when it makes the OTP authentication verification request.

(3) The authentication server 160 restores the divided OTP1 and divided OTP2 received from the service server 150, and performs OTP verification by comparing the restored OTP with an OTP stored in the password DB 161. In this case, the authentication server 160 receives the user ID from the service server 150 along with the OTP authentication verification request, reads an OTP matched up with the received user ID among OTPs stored in the password DB 161, and compares the restored OTP with the read OTP.

(4) When the authentication server 160 succeeds in the OTP verification, it requests a new OTP from the OTP server 170 again.

(5) The OTP server 170 randomly generates an OTP in response to the new OTP request of the authentication server 160, and transmits the generated OTP to the authentication server 160.

(6) The authentication server 160 stores the OTP, received from the OTP server 170, in the password DB 161. At this time, the authentication server 160 discards the old OTP stored in relation to the user ID, stores the OTP received from the OTP server 170, and generates two OTPs, that is, a divided OTP1 and a divided OTP2 by dividedting the OTP received from the OTP server 170. For example, if an OTP received from the OTP server 170 is {1357924680}, the authentication server 160 may divided the received OTP into a divided OTP1 {13579} and a divided OTP2 {24680}.

(7) If the authentication server 160 succeeds in the OTP verification, it transmits the divided OTP1 and the divided OTP2 to the service server 150. If the authentication server 160 fails in the OTP verification, it transmits verification failure data (NG value) to the service server 150.

(8) If the service server 150 succeeds in the OTP verification, it permits a user login, that is, the service access of the first electronic device 110, and stores one of the divided OTP1 and divided OTP2 received from the authentication server 160, for example, the divided OTP1 in the server divided password DB 151. At this time, the service server 150 discards the old divided OTP1 related to the user ID and device information of the first electronic device 110, and stores the new divided OTP1. Furthermore, if the OTP verification fails, the service server 150 processes an OTP verification failure.

(9) If the service server 150 succeeds in the OTP verification, it transmits the other of the divided OTP1 and divided OTP2 received from the authentication server 160, for example, the divided OTP2 to the first electronic device 110. If the OTP verification fails, the service server 150 transmits verification failure data (NG value) to the first electronic device 110.

Figure 7:
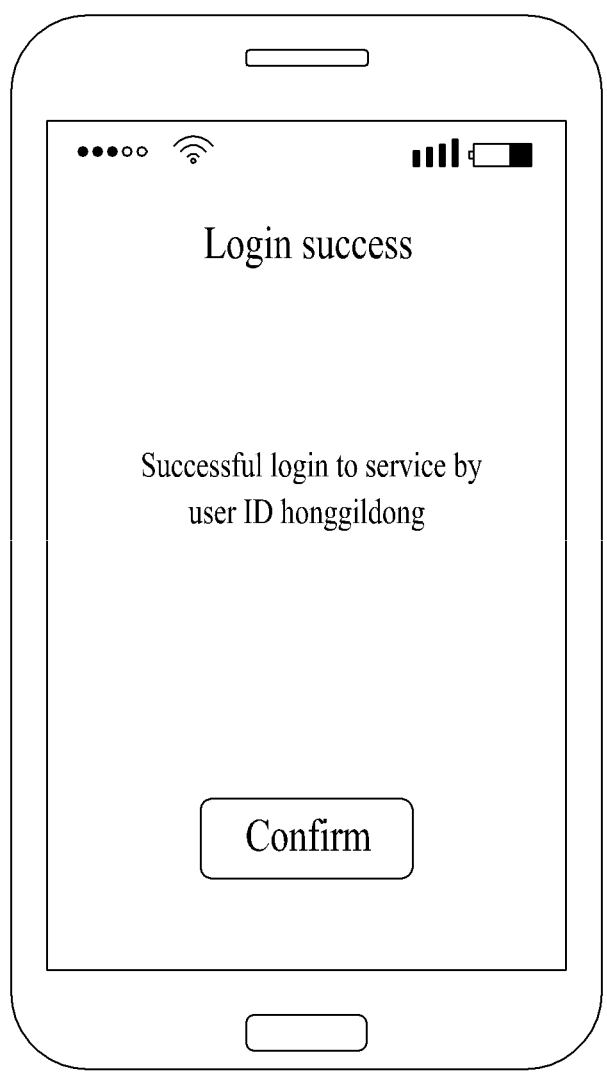

(10) The first electronic device 110 stores the divided OTP2, received from the service server 150, in the device divided password DB 111. At this time, the first electronic device 110 discards the old divided OTP2 stored in the device divided password DB 111 and stores the new divided OTP2 as soon as the first electronic device 110 accesses the service server 150. When the first electronic device 110 succeeds in service access, it displays information indicating that the service access has succeeded as shown in FIG. 7. When verification failure data (NG value) is received from the service server 150, the first electronic device 110 processes the service access as a service access failure and displays information indicating that the service access has failed.

Figure 8:
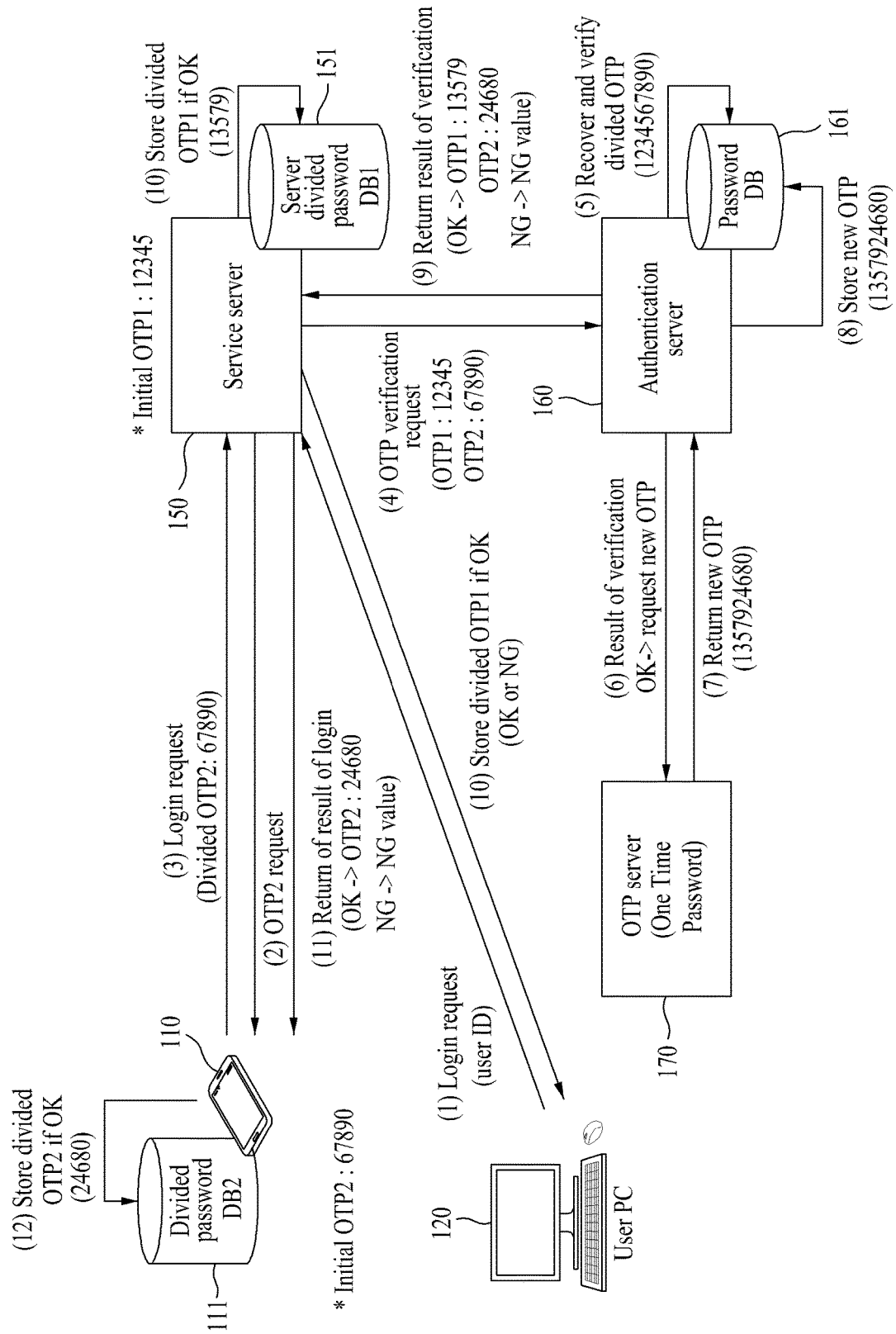
FIG. 8 is an exemplary diagram for illustrating an authentication processing procedure using a different electronic device other than a first electronic device that has joined service in an embodiment of the present invention.

FIG. 8 is an exemplary diagram for illustrating an authentication processing procedure using a different electronic device other than a first electronic device that has joined service in an embodiment of the present invention.

The user of the first electronic device 110 performs service subscription using the first electronic device 110, and may access the service server 150 using the second electronic device 120 other than the first electronic device 110.

(1) If the second electronic device 120 that has not been previously joined makes an access attempt, the service server 150 may request the input of a user ID. When the user inputs a user ID through the second electronic device 120, the second electronic device 120 transmits the input user ID to the service server 150.

(2) The service server 150 searches the server divided password DB 151 for device information matched up with the corresponding user ID based on the user ID received from the second electronic device 120, and requests a divided OTP2 from a device corresponding to the retrieved device information, that is, the first electronic device 110.

(3) The first electronic device 110 reads the divided OTP2, stored in the device divided password DB 111, in response to the request of the service server 150, and transmits the read divided OTP2 to the service server 150. At this time, the first electronic device 110 may output notification information for the divided OTP2 request of the service server 150 through an image or video so that the user can recognize others' malicious use for the user ID. If the user of the first electronic device 110 accepts the use of the user ID using a different electronic device, the first electronic device 110 may transmit the divided OTP2 to the service server 150.

(4) The service server 150 reads a divided OTP1, corresponding to device information searched for in step (2), from the server divided password DB 151, and requests OTP authentication verification by transmitting the read divided OTP1 to the authentication server 160 along with the divided OTP2 received from the first electronic device 110. When the service server 150 makes the OTP authentication verification, it forwards the user ID that has requested the service access to the authentication server 160.

(5) The authentication server 160 restores the divided OTP1 and divided OTP2 received from the service server 150, and performs OTP verification by comparing the restored OTP with an OTP stored in the password DB 161. In this case, the authentication server 160 receives the user ID from the service server 150 along with the OTP authentication verification request, reads an OTP matched up with the received user ID among OTPs stored in the password DB 161, and compares the restored OTP with the read OTP.

(6) If the authentication server 160 succeeds in the OTP verification, it requests a new OTP from the OTP server 170.

(7) The OTP server 170 randomly generates an OTP in response to the new OTP request of the authentication server 160, and transmits the generated OTP to the authentication server 160.

(8) The authentication server 160 stores the OTP, received from the OTP server 170, in the password DB 161. At this time, the authentication server 160 discards the old OTP stored in relation to the user ID, stores the OTP received from the OTP server 170, and generates two OTPs, that is, a divided OTP1 and a divided OTP2, by dividedting the OTP received from the OTP server 170. For example, if an OTP received from the OTP server 170 is {1357924680}, the authentication server 160 may divided the OTP into a divided OTP1 {13579} and a divided OTP2 {24680}.

(9) If the authentication server 160 succeeds in the OTP verification, it transmits the divided OTP1 and the divided OTP2 to the service server 150. If the authentication server 160 fails in the OTP verification, it transmits verification failure data (NG value) to the service server 150.

(10) If the service server 150 succeeds in the OTP verification, it permits a user login, that is, the service access of the second electronic device 120, and stores one of the divided OTP1 and divided OTP2 received from the authentication server 160, for example, the divided OTP1 in the server divided password DB 151. At this time, the service server 150 discards the old divided OTP1 related to the user ID and device information of the first electronic device 110, and stores the new divided OTP1. Furthermore, if the OTP verification fails, the service server 150 the OTP verification as failure processing and transmits verification failure data (NG value) to the second electronic device 120.

(11) If the service server 150 succeeds in the OTP verification, it transmits the other of the divided OTP1 and divided OTP2 received from the authentication server 160, for example, the divided OTP2 in the first electronic device 110. If the OTP verification fails, the service server 150 transmits verification failure data (NG value) to the first electronic device 110.

(12) The first electronic device 110 stores the divided OTP2, received from the service server 150, in the device divided password DB 111. At this time, the first electronic device 110 receives the new divided OTP2 from the service server 150 as soon as the second electronic device 120 is connected to the service server 150, discards the old divided OTP2 stored in the device divided password DB 111, and stores the new divided OTP2.

An environment in which the service server 150 and the authentication server 160 have been constructed as separate systems has been described above, but service that requires user authentication may be provided through the service server 150 combined with the authentication server 160 as a single system. In the environment in which the service server 150 and the authentication server 160 have been combined as a single system, the service server 150 may include and perform all the operations of the authentication server 160. In other words, the service server 150 may perform the processes, such as receiving an OTP by requesting it from the OTP server 170, dividedting an OTP, received from the OTP server 170, into a divided OTP1 and a divided OTP2, storing the divided OTP1 in the server divided password DB 151 and forwarding the divided OTP2 to the first electronic device 110, and processing user authentication using the divided OTP1 stored in the server divided password DB 151 and the divided OTP2 received from the first electronic device 110. Furthermore, in the environment in which the service server 150 and the authentication server 160 have been combined as a single system, a method using an OTP without dividedting the OTP may be applied. In other words, the service server 150 may receive a new OTP by requesting an OTP from the OTP server 170, may store the new OTP in the server divided password DB 151 without any change without spitting the new OTP, and may forward a new OTP, identical with the new OTP stored in the server divided password DB 151, to the first electronic device 110.

A service login has been illustrated as an example, but the present invention is not limited thereto. The authentication procedure described through FIG. 5 or 8 may be repeatedly performed in all steps that require user authentication.

The service server 150 may perform verification on OTPs divided and stored in the service server 150 and the first electronic device 110 in each step that requires user authentication, in addition to a service login. If the OTP verification is successful, the service server may provide service in a corresponding step, may discard an old OTP, may generate a new OTP, and may allocate the new OTP to the first electronic device 110.

A user can safely access the service server 150 without any additional behavior. Service is internally connected through the first electronic device 110 or the second electronic device 120, an old password for the first electronic device 110 is discarded, and a new password is allocated to the first electronic device 110. In the process of repeatedly discarding and generating an OTP, a user is notified of the discard and generation based on device information of the first electronic device 110. Accordingly, the user can immediately recognize others' malicious use and take rapid measures, such as an account use stop.

If the authentication processing according to the present invention is applied to a bank online service, a consecutive authentication effect can be achieved because an old OTP is discarded and a new OTP is generated for each behavior including service access and a new password is generated through the medium of an old password for each behavior consecutively from service access. Accordingly, an important service, such as the transfer of cash, can be safely processed without additional authentication, such as a certificate, through continued authentication from access.

If the authentication processing according to the present invention is applied to an automation device, such as an automatic teller machine in a bank, service can be started using a medium that can be authenticated, such as a credit card, a cash card or a bankbook, and user authentication can be immediately started using a device that has joined the service. Likewise, a consecutive authentication effect can be achieved because an old OTP is discarded and a new OTP is generated for each step performed in an automation device and a new password is generated through the medium of an old password for each behavior consecutively from service access. Accordingly, an important service, such as the transfer of cash, can be safely processed without additional authentication, such as a password, through continued authentication from access.

The above-described apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

MODE FOR INVENTION

As described above, although the embodiments have been described in connection with the limited embodiments and the drawings, those skilled in the art may modify and change the embodiments in various ways from the description. For example, proper results may be achieved although the above-described descriptions are performed in order different from that of the described method and/or the above-described elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

The invention claimed is:

1. An authentication processing method performed in a service server implemented as a computer, the method comprising steps of:
   (1) receiving a service subscription request, comprising user identification (ID) information and device information of a first electronic device, from the first electronic device;
   (2) receiving a one-time password (OTP) from an authentication server by requesting the OTP in response to the service subscription request, wherein a first divided OTP and second divided OTP divided from the OTP are received;
   (3) storing the first divided OTP along with the user ID information and the device information in response to the service subscription request and transmitting the second divided OTP to the first electronic device; and
   (4) transmitting the second divided OTP, received from the first electronic device, to the authentication server along with the first divided OTP with respect to a service requiring authentication for the user ID information, and performing authentication processing comprising receiving a service use request, comprising the user ID information of the first electronic device, from a second electronic device; searching for the device information matched up with the user ID information included in the service use request, and requesting the second divided OTP from the first electronic device corresponding to the device information; transmitting the second divided OTP to the authentication server along with the first divided OTP matched up with the user ID information included in the service use request when the second divided OTP is received from the first electronic device; permitting the service requested by the second electronic device if the authentication server succeeds in OTP verification and receiving a new OTP from the authentication server, wherein a third divided OTP and fourth divided OTP divided from the new OTP are received; and discarding the first divided OTP related to the user ID information and the device information, storing the third divided OTP, and transmitting the fourth divided OTP to the first electronic device, wherein the second divided OTP stored in the first electronic device is discarded and the fourth divided OTP is stored.

2. The method of claim 1, wherein the step (2) comprises: dividing, by the authentication server, the OTP generated by an OTP server into the first divided OTP and the second divided OTP in response to a request from the authentication server, and receiving the first divided OTP and the second divided OTP from the authentication server.

3. The method of claim 1, wherein: the step (3) comprises storing the first divided OTP, the user ID information, and the device information in a first database (DB) included in the service server or connected to the service server by matching the first divided OTP up with the user ID information and the device information, and the second divided OTP is stored in a second DB included in the first electronic device or connected to the first electronic device.

4. The method of claim 1, wherein the step (4) comprises: discarding an old OTP in the service server and the first electronic device for each service requiring authentication for the user ID information, and generating a new OTP for the first electronic device and allocating the new OTP.

5. The method of claim 1, wherein the step (4) comprises steps of: receiving a service use request, comprising the user ID information, the device information, and the second divided OTP, from the first electronic device; reading the first divided OTP matched up with the user ID information and device information included in the service use request, and transmitting the read first divided OPT to the authentication server along with the second divided OTP included in the service use request; permitting the service requested by the first electronic device if the authentication server succeeds in OTP verification, and receiving a new OTP from the authentication server, wherein a third divided OTP and fourth divided OTP divided from the new OTP are received; and discarding the first divided OTP related to the user ID information and the device information, storing the third divided OTP, and transmitting the fourth divided OTP to the first electronic device, wherein the second divided OTP stored in the first electronic device is discarded and the fourth divided OTP is stored.

6. A service server implemented as a computer, comprising:
   at least one processor implemented to execute a computer-readable command, wherein the at least one processor: receives a service subscription request, comprising user identification (ID) information and device information of a first electronic device, from the first electronic device, receives a one-time password (OTP) from an authentication server by requesting the OTP in response to the service subscription request, wherein a first divided OTP and second divided OTP divided from the OTP are received, stores the first divided OTP along with the user ID information and the device information in response to the service subscription request and transmits the second divided OTP to the first electronic device, and transmits the second divided OTP, received from the first electronic device, to the authentication server along with the first divided OTP with respect to a service requiring authentication for the user ID information, and performs authentication processing; and wherein the at least one processor: receives a service use request, comprising the user ID information of the first electronic device, from a second electronic device, searches for the device information matched up with the user ID information included in the service use request, and requests the second divided OTP from the first electronic device corresponding to the device information, transmits the second divided OTP to the authentication server along with the first divided OTP matched up with the user ID information included in the service use request when the second divided OTP is received from the first electronic device, permits the service requested by the second electronic device if the authentication server succeeds in OTP verification and receives a new OTP from the authentication server, wherein a third divided OTP and fourth divided OTP divided from the new OTP are received, and discards the first divided OTP related to the user ID information and the device information, stores the third divided OTP, and transmits the fourth divided OTP to the first electronic device, wherein in the first electronic device, the second divided OTP is discarded and the fourth divided OTP is stored.

7. The service server of claim 6, wherein the at least one processor discards an old OTP in the service server and the first electronic device for each service requiring authentication for the user ID information, and generates a new OTP for the first electronic device and allocating the new OTP.

8. The service server of claim 6, wherein the at least one processor: receives a service use request, comprising the user ID information, the device information, and the second divided OTP, from the first electronic device, reads the first divided OTP matched up with the user ID information and device information included in the service use request, and transmits the read first divided OPT to the authentication server along with the second divided OTP included in the service use request, permits the service requested by the first electronic device if the authentication server succeeds in OTP verification, and receives a new OTP from the authentication server, wherein a third divided OTP and fourth divided OTP divided from the new OTP are received, and discards the first divided OTP related to the user ID information and the device information, storing the third divided OTP, and transmits the fourth divided OTP to the first electronic device, wherein in the first electronic device, the second divided OTP is discarded and the fourth divided OTP is stored.

9. An authentication processing method performed in a service server implemented as a computer, the method comprising steps of:
(1) receiving a service subscription request, comprising user identification (ID) information and device information of a first electronic device, from the first electronic device;
(2) receiving a one-time password (OTP) from an OTP server by requesting the OTP in response to the service subscription request and dividedting dividing the received OTP into a first divided OTP and a second divided OTP;
(3) storing the first divided OTP along with the user ID information and the device information with respect to the service subscription request, and transmitting the second divided OTP to the first electronic device; and
(4) performing authentication processing using the first divided OTP along with the second divided OTP received by requesting the second divided OTP from the first electronic device with respect to a service requiring authentication for the user ID information.

10. A service server implemented as a computer, comprising: at least one processor implemented to execute a computer-readable command, wherein the at least one processor: receives a service subscription request, comprising user identification (ID) information and device information of a first electronic device, from the first electronic device, receives a one-time password (OTP) from an OTP server by requesting the OTP in response to the service subscription request and divides the received OTP into a first divided OTP and a second divided OTP, stores the first divided OTP along with the user ID information and the device information with respect to the service subscription request, and transmits the second divided OTP to the first electronic device, and performs authentication processing using the first divided OTP along with the second divided OTP received by requesting the second divided OTP from the first electronic device with respect to a service requiring authentication for the user ID information, and wherein the at least one processor: receives a service use request, comprising the user ID information of the first electronic device, from a second electronic device, searches for the device information matched up with the user ID information included in the service use request, and requests the second divided OTP from the first electronic device corresponding to the device information, transmits the second divided OTP to the authentication server along with the first divided OTP matched up with the user ID information included in the service use request when the second divided OTP is received from the first electronic device, permits the service requested by the second electronic device if the authentication server succeeds in OTP verification and receives a new OTP from the authentication server, wherein a third divided OTP and fourth divided OTP divided from the new OTP are received, and discards the first divided OTP related to the user ID information and the device information, stores the third divided OTP, and transmits the fourth divided OTP to the first electronic device, wherein in the first electronic device, the second divided OTP is discarded and the fourth divided OTP is stored.

* * * * *

UNITED STATES PATENT AND TRADEMARK OFFICE
CERTIFICATE OF CORRECTION

PATENT NO. : 11,240,230 B2
APPLICATION NO. : 16/486706
DATED : February 1, 2022
INVENTOR(S) : R. Cho et al.

Page 1 of 1

It is certified that error appears in the above-identified patent and that said Letters Patent is hereby corrected as shown below:

In the Claims

| Column | Line | |
|---|---|---|
| 15 | 37 | change "dividedting dividing" to -- dividing --. |

Signed and Sealed this
Seventh Day of February, 2023

Katherine Kelly Vidal
*Director of the United States Patent and Trademark Office*